Patented Mar. 31, 1970

3,503,994
MACROCYCLIC LACTONES
Edward B. Hodge, Phil H. Hidy, and Herbert L. Wehrmeister, Terre Haute, Ind., assignors to Commercial Solvents Corporation, a corporation of Maryland
No Drawing. Filed June 29, 1966, Ser. No. 561,394
Int. Cl. C07d 9/00
U.S. Cl. 260—343.2                    5 Claims

ABSTRACT OF THE DISCLOSURE

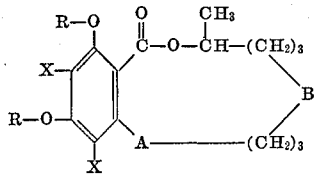

where R is selected from the group consisting of hydrogen, lower alkyl and benzyl; X is selected from the group consisting of hydrogen, halomercuri- and —AsO(OH$_2$), with the proviso that not more than one X is hydrogen; A is a radical selected from the group consisting of —CH=CH— and —CH$_2$—CH$_2$—, and B is a radical selected from the group consisting of >C=O, >CHOH and >CH$_2$ with the proviso that A is —CH$_2$—CH$_2$— when B is >CH$_2$.

---

The present invention relates to new compounds and more particularly to compound illustrated by the formula:

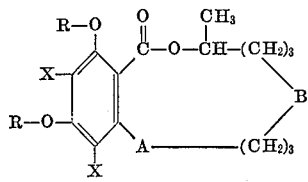

where A is —CH$_2$—CH$_2$— or —CH=CH—; R is hydrogen, substituted or unsubstituted alkyl, e.g., lower alkyl such as methyl, ethyl, hexyl, etc. or aralkyl, e.g., benzyl; X is hydrogen, halomercuri-, e.g., chloro-, iodo- or bromomercuri- or arsonic acid radicals, i.e., —AsO(OH)$_2$, with the proviso that not more than one X is hydrogen; and B is >C=O, >CHOH, or >CH$_2$ with the proviso that A is —CH$_2$—CH$_2$— when B is >CH$_2$.

The compounds of the present invention can be produced from the compound:

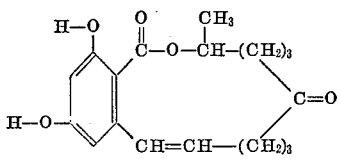

hereinafter referred to as the fermentation estrogenic substance (F.E.S.). Halomercuri derivatives are produced by reaction of, for example, mercuric acetate and F.E.S. and conversion of the resulting acetoxymercuri derivative to the halomercuri derivative by interaction with sodium halide, e.g., sodium chloride. Alkali arsenites react with F.E.S. diazonium compounds, described in copending application S.N. 561,369 (184–443A) filed concurrently herewith, now abandoned to produce arsonic acid derivatives. The compounds of this invention have antibacterial utility and also serve as intermediates for the production of iodo substituted F.E.S. compounds such as described in U.S. Patent 3,239,349 which have antibacterial activity, since the chloromercuri group is replaceable by iodine, e.g., in chloroform solution. Also the arsenic compounds of this invention have antibacterial and antifungal activity.

It can be desirable to protect the hydroxyl groups on the benzene ring of F.E.S. against undesirable side reactions before mercuration or arsonation which is accomplished by converting the hydroxyl groups to ethers, e.g., methyl ethers, as described in U.S. Patent 3,239,342 and subsequently removing the masking group to regenerate the hydroxyl group. The hydroxyl group can be regenerated from, for example, a methyl ether by hydrolysis or by refluxing in acetic acid solution with hydrobromic acid. Aluminum chloride is another effective dealkylating agent. Other masking groups include benzyl and compounds where R is benzyl are described in copending application Ser. No. 532,113, now abandoned. Dihydro F.E.S. compounds where A is —CH$_2$—CH$_2$— are described in U.S. Patent 3,239,354. Deoxy F.E.S. where B is >CH$_2$ and tetrahydro F.E.S. where B is >CHOH are described in U.S. Patents 3,239,341 and 3,239,345, respectively.

The following examples serve to illustrate the present invention.

EXAMPLE I

F.E.S. is reacted with mercuric acetate in alcoholic solution at an elevated temperature to produce 3,5-diacetoxymercuri F.E.S. and 5-acetoxymercuri F.E.S. which are then reacted with sodium chloride in aqueous solution to produce 3,5-dichloromercuri and 5-chloromercuri F.E.S.

EXAMPLE II

Dihydro F.E.S., F.E.S., 2,4-dimethylether, deoxy F.E.S., tetrahydro F.E.S. and 4-benzyl ether F.E.S. are reacted according to Example I at somewhat higher temperatures to produce the corresponding chloromercuri derivatives.

EXAMPLE III

F.E.S. is reacted according to Example I to produce the acetoxymercuri derivatives which are then added to an aqueous solution of sodium bromide to produce the corresponding bromomercuri derivatives.

EXAMPLE IV

F.E.S. is heated with arsenic acid at 160° C., in aqueous solution to produce:

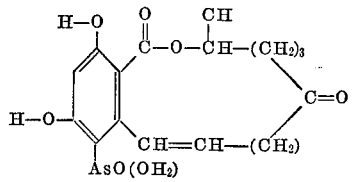

The 2,4-dimethylether-3,5-bis(diazonium chloride) of F.E.S. is added to an aqueous solution of sodium arsenite in the presence of a catalytic amount of cuprous chloride to produce:

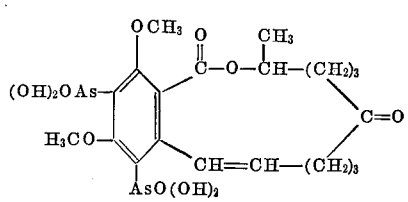

It is claimed:
1.

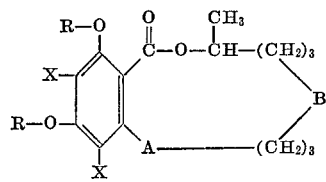

where R is selected from the group consisting of hydrogen, lower alkyl and benzyl; X is selected from the group consisting of hydrogen, chloromercuri- and bromomercuri-, with the proviso that not more than one X is hydrogen and when one X is hydrogen it is in the 3 position of the benzene ring; A is a radical selected from the group consisting of —CH=CH— and —$CH_2$—$CH_2$—; and B is >C=O.

2. The compound of claim 1 wherein at least one X is chloromercuri- and R is hydrogen.

3. The compound of claim 1 wherein at least one X is chloromercuri- and R is lower alkyl.

4. The compound of claim 1 wherein R is lower alkyl.

5. The compound of claim 1 wherein R is hydrogen.

No references cited.

JAMES A. PATTEN, Primary Examiner

U.S. Cl. X.R.

260—999